United States Patent [19]

Favre et al.

[11] 4,207,465

[45] Jun. 10, 1980

[54] ISOTOPE ANALYSIS WITH A MASS SPECTROMETER USING SMALL SAMPLES

[75] Inventors: John A. Favre; Thomas W. Schmidt, both of Bartlesville, Okla.

[73] Assignee: Phillips Petroleum Company, Bartlesville, Okla.

[21] Appl. No.: 921,684

[22] Filed: Jul. 3, 1978

[51] Int. Cl.[2] ........................ B01D 59/44; H01J 39/34

[52] U.S. Cl. .................................... 250/288; 250/281; 73/422 GC; 250/282

[58] Field of Search ............... 250/281, 282, 288, 289, 250/423, 457; 73/55, 422 GC

[56] References Cited

U.S. PATENT DOCUMENTS

| | | | |
|---|---|---|---|
| 2,714,164 | 7/1955 | Riggle et al. | 250/289 |
| 2,880,323 | 3/1959 | Reinecke et al. | 250/289 |
| 3,633,426 | 1/1972 | Broerman | 73/422 GC |
| 3,924,124 | 12/1975 | Favre et al. | 250/288 |
| 3,943,363 | 3/1976 | Amblard | 250/281 |
| 4,043,202 | 8/1977 | Etheridge | 73/422 GC |
| 4,046,012 | 9/1977 | Studenick | 250/288 |

*Primary Examiner*—Bruce C. Anderson

[57] ABSTRACT

The difference in the concentration of a selected isotope in a first material and a second material, which may be a reference material, is measured by means of a mass spectrometer. The analysis is carried out with only a small amount of sample by introducing only a small slug of sample of the first material into the mass spectrometer by means of a sample valve. If there is a sufficient quantity of the second material, the first material my be compared directly to the second material. Direct comparison is also used when the second material is a reference material. If there is also only a small supply of the second material then the first material is compared to a reference material and in like manner the sample valve is utilized to supply a small sample of the second material to the mass spectrometer to be compared to the reference material. An indirect comparison of the first and second materials is thus provided.

25 Claims, 4 Drawing Figures

ISOTOPE ANALYSIS WITH A MASS SPECTROMETER USING SMALL SAMPLES

This invention relates to isotope analysis. In a particular aspect this invention relates to method and apparatus for measuring the differences in the concentration of a selected isotope in two materials. In a second particular aspect this invention relates to method and apparatus for measuring the differences in the concentration of a selected isotope in two materials where only a small sample of at least one of the materials is available.

It is often desirable to measure differences in the concentration of a selected isotope in two materials. For example, such a procedure can be used as an aid in determining if petroleum samples derived from two different wells came from a common reservoir. Previous methods utilized to measure the differences in the concentration of a selected isotope in two materials have required large sample volumes of both materials. However, many times only a very small sample of either one or both of the materials is available. Previous methods have been unable to measure the differences in the concentration of a selected isotope in two materials if only a very small sample of one of the materials was available.

It is thus an object of this invention to provide method and apparatus for measuring the differences in the concentration of a selected isotope in two materials. A second object of this invention is to provide method and apparatus for measuring the differences in the concentration of a selected isotope in two materials where only a small sample of at least one of the materials is available.

In accordance with the present invention, a sample valve is utilized to provide a very small sample of one of the two materials to be analyzed to the sample side of a mass spectrometer. A reference material is provided to the reference side of the mass spectrometer. Beams are formed from the sample material and from the reference material and these beams are directed in separate paths toward the inlet of a mass spectrometer which is set to measure a selected isotope. A shutter is positioned in the two beams and actuated so that the beams are alternately transmitted. This results in a fluctuating output signal from the mass spectrometer, with alternate half cycles being representative of the concentrations of the measured isotope in the sample and reference material. Apparatus must be provided to establish a reference signal at the same frequency at which the beams are alternately passed to the mass spectrometer. This reference signal and the output signal of the mass spectrometer are applied to a synchronous detector which establishes a single output signal representative of the difference in the concentration of the selected isotope in the sample material and the reference material. If there is a large supply of one of the materials being analyzed then this material may be utilized as a reference material and a direct comparison can thus be made. If only a small sample of each of the materials to be analyzed is available then a different material, having a known isotope concentration, is utilized as a reference material and both materials to be analyzed are compared against the known reference material to determine the difference, if any, in the concentration of a selected isotope in the two materials to be analyzed. Also only one material may be compared against a known reference material if desired.

Other objects and advantages of the invention will be apparent from the detailed description of the invention and the appended claims as well as from the detailed description of the drawings in which:

The invention is described in terms of a particular sample valve configuration. The invention is not limited to this particular sample valve configuration but is applicable to any sample valve configuration capable of supplying a small sample to the mass spectrometer of the present invention. The invention is also applicable to sample valves which are controlled in a manner other than that illustrated in FIG. 1.

The invention is also described in terms of a preferred embodiment wherein a particular mass spectrometer configuration is used and a particular signal processing technique is used. The invention is applicable to any mass spectrometer configuration capable of accepting and comparing a sample material and a reference material and is applicable to any signal processing technique capable of presenting the desired comparison as intelligible data.

Figure 1:
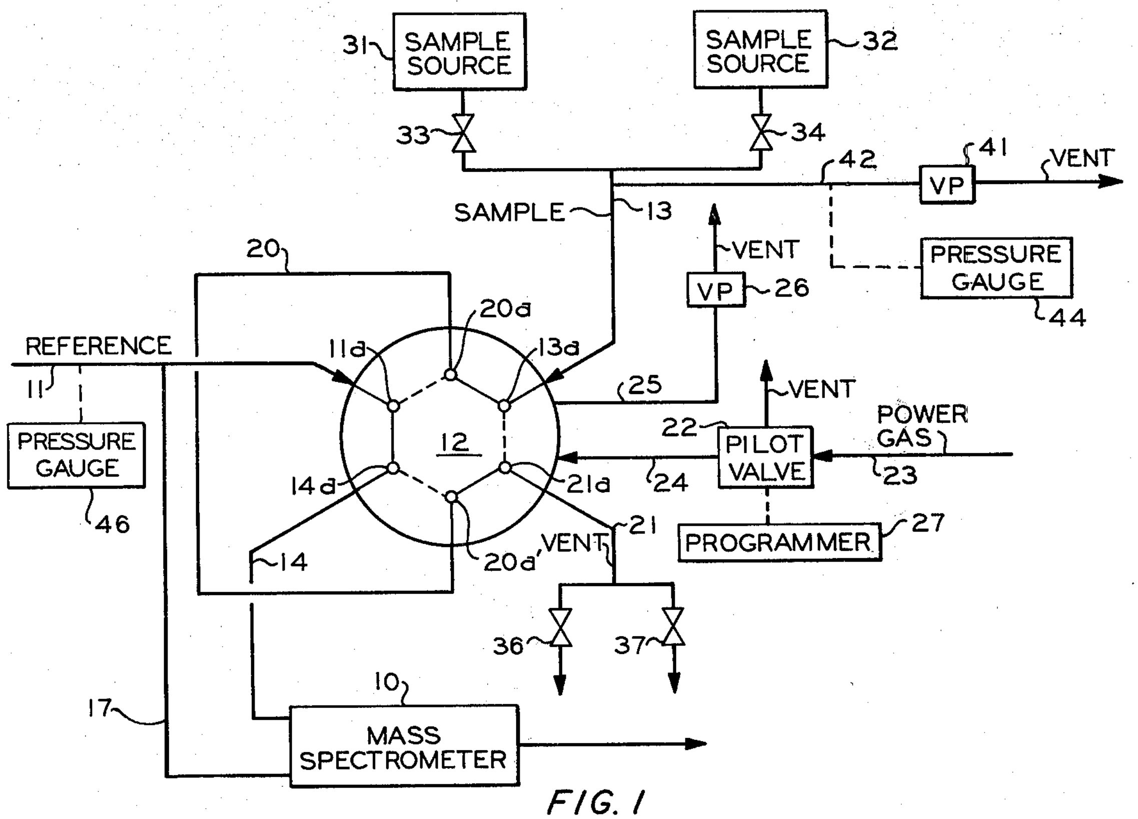
FIG. 1 illustrates a sample valve connected to a mass spectrometer.

Referring now to the drawings and in particular to FIG. 1 there is shown a mass spectrometer 10 having a sample input and a reference input. A reference material is introduced through conduit means 11 which communicates with the first inlet port 11a of a sample valve 12 and through conduit means 17 with the reference input of the mass spectrometer 10. As has been previously stated, this reference material may be one of the materials to be analyzed if there is an ample supply or may be a material having a known isotope concentration.

A sample of a material to be analyzed is introduced through conduit 13 which communicates with an inlet port 13a of sample valve 12. A conduit 14 extends from sample valve port 14a to the sample inlet of the mass spectrometer 10.

The sample to be analyzed may be introduced from either sample source 31 or sample source 32 by means of control valves 33 and 34 respectively. If the second mateial is being used as a reference material or if only one material is being compared to a reference material, then only one sample source is utilized. Control valve 34 would be closed while control valve 33 would be open. The sample to be analyzed would be provided from sample source 31.

If two samples are being compared to a reference material to obtain an indirect comparison of the two samples then both sample source 31 and sample source 32 are utilized. Control valve 33 is opened to supply a sample from sample source 31; control valve 34 is opened to supply a sample from sample source 32.

Sample valve 12 is employed to introduce the predetermined volume of sample selectively to the sample input of mass spectrometer 10. This is accomplished by means of a sample loop 20 which extends between ports 21a and 20a' in such a manner that the sample initially flows through the loop to fill the interior thereof. After flowing through sample loop 20, the sample is vented through a conduit 21 which communicates with port 21*a*. The sample may be vented to the atmosphere or collected. If only one sample is being analyzed then only control valve 36 is opened. If two samples are being compared then control valve 36 is opened when the sample is being provided from sample source 31 and control valve 37 is opened when the sample is being provided from sample source 32.

Initially, the reference material flows from conduit 11 through valve 12 to conduit 14 and from there to the sample input of the mass spectrometer 10. When the valve is actuated, the flow of the reference material is diverted within the valve so as to pass through loop 20 before entering outlet conduit 14. At the same time, the flow of sample is vented. This results in the reference material forcing the volume of sample which originally occupied the loop out through conduit 14 to the sample input of the mass spectrometer 10. Sample valve 12 is pneumatically operated and receives operating pressure from a pilot valve 22. Power gas is introduced into valve 22 through an inlet conduit 23. A conduit 24 extends between the pilot valve and the sample valve. A conduit 25 extends between a vacuum pump 26 and sample valve 22 to facilitate operation of the sample valve. The operation of the sample valve can be controlled by a programmer 27 which actuates pilot valve 22 at predetermined intervals.

The sample loop 20 preferably has a very small diameter and a long length. In this manner the mixing problems inherent in a short sample loop having a large diameter are avoided and a relatively pure sample may be provided to the sample input of the mass spectrometer 10. Approximately 1 cc of sample is presently preferred. A sample loop having an inside diameter of 0.15875 cm and a length of about 50 cm is presently preferred to obtain this volume while still providing a relatively pure sample. Lengths up to about 500 cm may be utilized if sufficient sample is available.

When a very small sample is available it is necessary to utilize the vacuum pump 41, which is operably connected to conduit 13 through conduit means 42 to evacuate the sample loop 20. This is accomplished by closing all of the control valves 33, 34, 36 and 37 and turning on the vacuum pump 41. The pressure gauge 44 provides an indication of when the sample loop 20 has been evacuated.

After the sample loop 20 has been evacuated the sample can be introduced by opening control valve 33 or control valve 34. Pressure gauge 44 is utilized to monitor the pressure of the sample in the sample loop. Pressure gauge 46 is utilized to monitor the pressure of the reference fluid. Preferably the sample pressure in the sample loop 20 is adjusted so as to be approximately equal to the reference fluid pressure before the sample is introduced into the reference fluid to be supplied to the mass spectrometer 10.

Evacuating the sample loop 20 by means of the vacuum pump 41 is necessary where only a small sample is available. If sufficient sample is available to flush out the sample loop 20 then the sample loop need not be evacuated but may be if desired.

Figure 2:
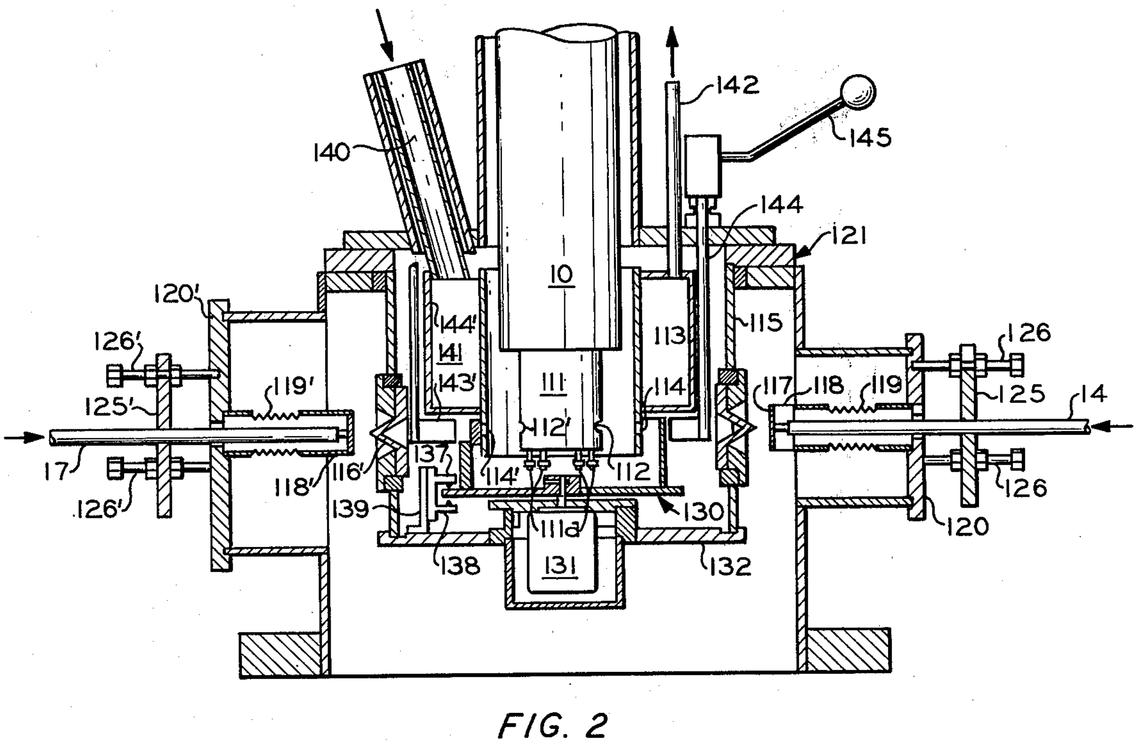
FIG. 2 is a view, shown partially in section, of an embodiment of the mass spectrometer and associated apparatus.

Referring now to FIG. 2, there is shown a mass spectrometer 10 having a sample inlet section 111. Section 111 is provided with a first opening 112 through which a molecular beam can be introduced into the ionization chamber of the mass spectrometer. Inlet section 111 is surrounded by a sleeve 113 which has an opening 114 therein in alignment with opening 112. Sleeve 113 is surrounded by a sleeve 115 which supports a conical member 116. A small hole is formed in the tip of member 116, which hole can be of a diameter of the order of 15 to 30 mils, for example. A plate 117, which has a central opening therein, is attached to an annular member 118 which is supported by a bellows 119 that extends from a plate 120. The central opening in plate 117 can have a diameter of the order of 1 to 6 mils, for example. Plate 120 is secured to a housing 121 which supports the mass spectrometer and the elements thus far described. A hollow tube 124 extends from member 118 through a plate 125 to which it is attached. Plate 125 is secured to plate 120 by a plurality of adjusting screws 126.

The sample of one of the materials to be analyzed is supplied through conduit means 14 from the sample valve 12. A molecular beam of this material passes through the opening in plate 117, the opening in the tip of cone 116, and openings 114 and 112 to enter the inlet section 111 of mass spectrometer 10. Adjusting screws 126 permit conduit means 14 to be aligned so that a narrow beam can pass through the small opening in cone 116.

Inlet section 111 of the mass spectrometer is provided with a second opening 112' on the opposite side from opening 112. Additional elements corresponding to those thus far described are located on this side of the instrument and are designated by corresponding primed reference numerals. These additional elements permit the reference material introduced through conduit means 17 to enter opening 112' in inlet section 111.

Figure 3:
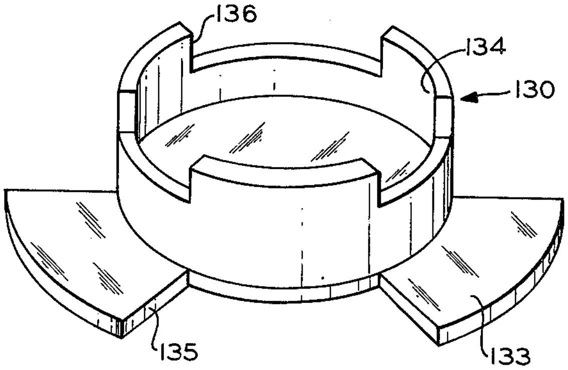
FIG. 3 illustrates the shutter employed in the apparatus of FIG. 2.

A shutter 130 is rotated by a motor 131 which is supported by a plate 132 that extends across the bottom of sleeve 115. Shutter 130 is illustrated in detail in FIG. 3 as comprising a disk 133 having a sleeve 134 extending upwardly therefrom. Disk 133 is provided with three openings 135 in the periphery thereof, and sleeve 134 is provided with three openings 136. As illustrated, the openings 135 and 136 are offset and are equally spaced, with each extending approximately 60° about the circular shutter. Thus, openings 136 permit molecular beams to be transmitted alternately through openings 114 and 114'. Shutter 130 can be rotated at a speed of 10 to 30 revolutions per second, for example.

A light source 137 and a photocell detector 138 are mounted by a bracket 139, as shown in FIG. 2, so that light is transmitted from source 137 to detector 138 when one of the slots 135 of shutter 130 appears between the two elements. The output signal from detector 138 thus comprises a series of pulses at a frequency corresponding to the frequency at which the molecular beams are alternately transmitted to the mass spectrometer.

The apparatus of FIG. 2 is normally maintained at a relatively low pressure. The sample of the material to be analyzed can be introduced through tube 14 at a pressure approximately atmospheric. However, pressures considerably above and below atmospheric can be employed if desired. The interior of housing 121 outside sleeve 115 and plate 132 is connected to a vacuum pump, not shown, so as to reduce the pressure to a value which is generally in the range of $10^{-3}$ to $10^{-7}$ Torr. The interior of sleeve 115 can be connected to a vacuum pump, not shown, to reduce the pressure to a value in the general range of $10^{-5}$ to $10^{-8}$ Torr. A coolant, such as liquid nitrogen, can be introduced through a conduit 140 into a chamber 141 which surrounds sleeve 113. This coolant is vented through a conduit 142. A rotatable shutter 143 is mounted on a rod 144 which is connected to a handle 145 so that the beam entering through cone 116 can be blocked if desired to calibrate the instrument. A similar shutter 143' can be positioned in the beam which enters through cone 116'. Electrical leads to the mass spectrometer can be attached to a series of terminals **111*a*.**

Figure 4:
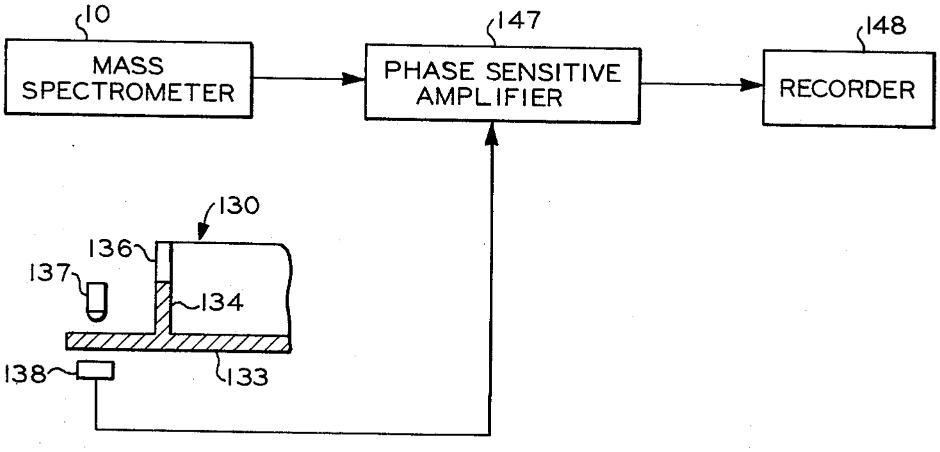
FIG. 4 illustrates the signal processing for the output signal from the mass spectrometer of FIG. 2.

As illustrated in FIG. 4, the output signal of mass spectrometer 10 is applied to the first input of a phase sensitive amplifier 147. The signal from photocell 138 is applied to the second input of the amplifier 147. Phase sensitive amplifiers are well known in the art. For example, this amplifier can be the Model 840 Autoloc Amplifier described in *Keithley Engineering Notes,* Volume 19, No. 1, of Keithley Instruments, 28775 Auroro Road, Cleveland, Ohio 44139. The output signal of amplifier 147 is applied to a recorder 148.

In operation, the mass spectrometer is set to measure a desired isotope. If the sample of one of the materials to be analyzed contains the same amount of this isotope as the reference material, the output signal from the mass spectrometer is constant. However, a square wave output is obtained if there is a difference in the concentration of the isotope in the sample material and the reference material. Amplifier 147 serves to amplify the signal which is in phase with the reference signal established by detector 138. The output signal from amplifier 147 is essentially the integral of the amplified square wave signal from the mass spectrometer, so that a D.C. signal is applied to the recorder. The amplitude of the signal is thus representative of the difference in concentration of the selected isotope in the sample material and the reference material.

If there is a sufficient quantity of one of the materials to be analyzed to allow its usage as a reference material then the difference in the isotope concentration in the two materials to be analyzed can be determined by a simple direct comparison. If the output signal from the amplifier 147 is not zero when this direct comparison is made then there is a difference in the concentration of the selected isotope in the two materials to be analyzed.

If there is only a small sample of both materials to be analyzed available, then a material which is known to have the selected isotope present must be utilized as a reference material. The first material to be analyzed is compared to this reference material and the magnitude of the output signal from the amplifier 147 is noted. The second material to be analyzed is then compared to the reference material and the magnitude of the output signal from the amplifier 147 is again noted. The two output signals are then compared. If there is no difference then the concentration of the selected isotope in the two materials to be analyzed is the same. If there is a difference then the concentration of the selected isotope in the two materials to be analyzed is different.

The invention has been described in terms of the presently preferred embodiment as illustrated in FIGS. 1–4. A sample valve which may be utilized in the present invention is illustrated in U.S. Pat. No. 3,633,426 which issued Jan. 11, 1972.

While the invention has been described in terms of the presently preferred embodiment, reasonable variations and modifications are possible by those skilled in the art, within the scope of the described invention and the appended claims.

That which is claimed is:

1. Apparatus for determining the difference in the concentration of a selected isotope in first and second materials to be analyzed, where only a small sample of said first material is available for analysis but a large sample of said second material is available for analysis, comprising:

- a mass spectrometer having an inlet to receive materials to be analyzed, said inlet having first and second openings therein, said mass spectrometer having first and second means for ionizing a fluid, said mass spectrometer being capable of providing an output signal representative of the concentration of a selected isotope in a material introduced into said mass spectrometer;
- a sample valve means having a sample loop;
- means for supplying said second material as a carrier fluid to said sample valve means;
- means for supplying said first material to said sample loop of said sample valve means;
- means for actuating said sample valve means to supply the volume of said first material contained in said sample loop of said sample valve means to said first means for ionizing a fluid to thereby form a molecular beam of said first material, said sample loop having a diameter and length sufficient to substantially prevent mixing of said first material and said carrier fluid;
- means for supplying said second material to said second means for ionizing a fluid to thereby form a molecular beam of said second material;
- means for directing the molecular beam of said first material towards said first opening of said inlet of said mass spectrometer;
- means for directing the molecular beam of said second material towards said second opening of said inlet of said mass spectrometer;
- shutter means positioned so as to intersect the molecular beam of said first material and the molecular beam of said second material;
- means for actuating said shutter means so that the molecular beam of said first material and the molecular beam of said second material are passed to said inlet of said mass spectrometer alternatively;
- a phase sensitive detector means;
- means for supplying the output signal from said mass spectrometer to said phase sensitive detector means;
- means, responsive to said means for actuating said shutter means, for establishing a reference signal having a frequency corresponding to the frequency at which the molecular beam of said first material and the molecular beam of said second material are alternatively passed to said inlet of said mass spectrometer; and
- means to supply said reference signal to said phase sensitive detector means, said phase sensitive detector means supplying an output signal representative of the difference in the concentration of said selected isotope in said first material and the concentration of said selected isotope in said second material.

2. Apparatus in accordance with claim 1 wherein said first material is a material having an unknown concentration of said selected isotope and said second material is a reference material having a known concentration of said selected isotope.

3. Apparatus in accordance with claim 1 wherein both said first material and said second material are materials having unknown concentrations of said selected isotope.

4. Apparatus in accordance with claim 1 wherein the volume of sample contained in said sample loop of said sample valve is at least about 1 cc.

5. Apparatus in accordance with claim 4 wherein said sample loop of said sample valve means has an inside diameter of about 0.159 cm and a length in the range of about 50 cm to about 500 cm.

6. Apparatus in accordance with claim 1 wherein said output signal from said mass spectrometer is constant and said output signal from said phase sensitive detector is equal to zero when the concentration of said selected isotope in said first material is equal to the concentration of said selected isotope in said second material.

7. Apparatus in accordance with claim 6 wherein said output signal from said mass spectrometer is a square wave and said output signal from said phase sensitive detector is equal to the integral of said square wave when the concentration of said selected isotope in said first material is equal to the concentration of said selected isotope in said second material.

8. Apparatus for determining the difference in the concentration of a selected isotope in first and second materials to be analyzed, where only a small sample of said first material and a small sample of said second material are available for analysis, comprising:

a mass spectrometer having an inlet to receive materials to be analyzed, said inlet having first and second openings therein, said mass spectrometer having first and second means for ionizing a fluid, said mass spectrometer being capable of providing an output signal representative of the concentration of a selected isotope in a material introduced into said mass spectrometer;

a sample valve means having a sample loop;

means for supplying a third material, containing a known concentration of said selected isotope, as a carrier fluid to said sample valve means;

means for supplying said first material to said sample loop of said sample valve means;

means for actuating said sample valve means to supply the volume of said first material contained in said sample loop of said sample valve means to said first means for ionizing a fluid to thereby form a molecular beam of said first material, said sample loop having a diameter and length sufficient to substantially prevent mixing of said first material and said carrier fluid;

means for supplying said third material to said second means for ionizing a fluid to thereby form a molecular beam of said third material;

means for directing the molecular beam of said first material towards said first opening of said inlet of said mass spectrometer;

means for directing the molecular beam of said third material towards said second opening of said inlet of said mass spectrometer;

shutter means positioned so as to intersect the molecular beam of said first material and the molecular beam of said third material;

means for actuating said shutter means so that the molecular beam of said first material and the molecular beam of said third material are passed to said inlet of said mass spectrometer alternatively;

a phase sensitive detector means;

means for supplying the output signal from said mass spectrometer to said phase sensitive detector means;

means, responsive to said means for actuating said shutter means, for establishing a reference signal having a frequency corresponding to the frequency at which the molecular beam of said first material and the molecular beam of said third material are alternatively passed to said inlet of said mass spectrometer;

means for supplying said reference signal to said phase sensitive detector means, said phase sensitive detector means supplying a first output signal representative of the difference in the concentration of said selected isotope in said first material and said third material, said second material being supplied to said mass spectrometer in the same manner as said first material after the comparison of said first material and said third material is completed, a molecular beam of said second material replacing the molecular beam of said first material, said phase sensitive detector means supplying a second output signal representative of the difference in the concentration of said selected isotope in said second material and the concentration of said selected isotope in said third material; and means for comparing said first output signal and said second output signal to determine the difference in the concentration of said selected isotope in said first material and in said second material.

9. Apparatus in accordance with claim 8 additionally comprising:

a first sample source containing said first material;

a second sample source containing said second material;

a first valve means;

a second valve means;

means for supplying said first material from said first sample source through said first valve means to said means for supplying said first material to said sample loop of said sample valve means; and means for supplying said second material from said second sample source through said second valve means to said means for supplying said first material to said sample loop of said sample valve means, said first valve means being open and said second valve means being closed when it is desired to supply said first material to said sample loop of said sample valve means, said first valve means being closed and said second valve means being open when it is desired to supply said second material to said sample loop of said sample valve means.

10. Apparatus in accordance with claim 8 wherein both said first material and said second material are materials having unknown concentrations of said selected isotope.

11. Apparatus in accordance with claim 8 wherein the volume of sample contained in said sample loop of said sample valve is at least about 1 cc.

12. Apparatus in accordance with claim 11 wherein said sample loop of said sample valve means has an inside diameter of about 0.159 cm and a length in the range of about 50 cm to about 500 cm.

13. A method for determining the difference in the concentration of a selected isotope in first and second materials to be analyzed, where only a small sample of said first material is available for analysis but a large sample of said second material is available for analysis, comprising the steps of:

supplying said second material as a carrier fluid to a sample valve;

supplying said first material to the sample loop of said sample valve;

actuating said sample valve to supply the volume of said first material contained in said sample loop to a first means for ionizing a fluid to thereby form a molecular beam from said first material, said sample loop having a diameter and length sufficient to substantially prevent mixing of said first material and said carrier fluid;

supplying said second material to a second means for ionizing a fluid to thereby form a molecular beam from said second material;

directing the molecular beam of said first material towards a first opening in the inlet to a mass spectrometer, said mass spectrometer being capable of providing an output signal representative of the concentration of a selected isotope in a material introduced into said mass spectrometer;

directing the molecular beam of said second material towards a second opening in said inlet to said mass spectrometer;

passing the molecular beam of said first material and the molecular beam of said second material to said inlet of said mass spectrometer alternatively;

establishing a reference signal having a frequency corresponding to the frequency at which the molecular beam of said first material and the molecular beam of said second material are alternatively passed to said inlet of said mass spectrometer; and establishing a difference signal representative of the difference in the concentration of said selected isotope in said first material and the concentration of said selected isotope in said second material in response to the output signal from said mass spectrometer and said reference signal.

14. A method in accordance with claim 13 wherein said output signal from said mass spectrometer is constant and said difference signal is equal to zero when the concentration of said selected isotope in said first material is equal to the concentration of said selected isotope in said second material.

15. A method in accordance with claim 14 wherein said output signal from said mass spectrometer is a square wave and said difference signal is approximately equal to the integral of said square wave when the concentration of said selected isotope in said first material is not equal to the concentration of said selected isotope in said second material.

16. A method in accordance with claim 13 wherein said first material is a material having an unknown concentration of said selected isotope and said second material is a reference material having a known concentration of said selected material.

17. A method in accordance with claim 13 wherein both said first material and said second material are materials having unknown concentrations of said selected isotope.

18. A method in accordance with claim 13 wherein the volume of sample contained in said sample loop of said sample valve is at least about 1 cc.

19. A method in accordance with claim 18 wherein said sample loop of said sample valve has an inside diameter of about 0.159 cm and a length in the range of about 50 cm to about 500 cm.

20. A method for determining the difference in the concentration of a selected isotope in first and second materials to be analyzed, where only a small sample of said first material and a small sample of said second material are available for analysis, comprising the steps of:

supplying a third material, having a known concentration of said selected isotope, as a carrier fluid to a sample valve;

supplying said first material to the sample loop of said sample valve;

actuating said sample valve to supply the volume of said first material contained in said sample loop to a first means for ionizing a fluid to thereby form a molecular beam from said first material, said sample loop having a diameter and length sufficient to substantially prevent mixing of said first material and said carrier fluid;

supplying said third material to a second means for ionizing a fluid to thereby form a molecular beam from said third material;

directing the molecular beam of said first material towards a first opening in the inlet to a mass spectrometer, said mass spectrometer being capable of providing an output signal representative of the concentration of a selected isotope in a material introduced into said mass spectrometer;

directing the molecular beam of said third material towards a second opening in said inlet to said mass spectometer;

passing the molecular beam of said first material and the molecular beam of said third material to said inlet of said mass spectrometer alternatively;

establishing a reference signal having a frequency corresponding to the frequency at which the molecular beam of said first material and the molecular beam of said third material are alternatively passed to said inlet of said mass spectrometer;

establishing a first difference signal representative of the difference in the concentration of said selected isotope in said first material and the concentration of said selected isotope in said third material in response to a first output signal from said mass spectrometer and said reference signal, said first output signal from said mass spectrometer being establised as a response to the comparison of said first material and said third material;

supplying said second material to the sample loop of said sample valve after the analysis of said first material is completed;

actuating said sample valve to supply the volume of said second material contained in said sample loop of said sample valve to said first means for ionizing a fluid to thereby form a molecular beam from said first material, the molecular beam of said second material replacing the molecular beam of said first material;

directing the molecular beam of said second material towards said first opening in the inlet of said mass spectrometer;

passing the molecular beam of said second material and the molecular beam of said third material to said inlet of said mass spectrometer alternatively, the frequency at which the molecular beam of said second material and the molecular beam of said third material are alternated corresponding to the frequency at which the molecular beam of said first material and the molecular beam of said third material are alternated;

establishing a second difference signal representative of the difference in the concentration of said selected isotope in said second material and the concentration of said selected isotope in said third material in response to a second output signal from said mass spectrometer and said reference signal, said second output signal representing the response of said mass spectrometer to the comparison of said second material and said third material;

comparing said first difference signal and said second difference signal to determine if there is a difference in the concentration of said selected isotope in said first material and the concentration of said selected isotope in said second material.

21. A method in accordance with claim 20 wherein said first output signal from said mass spectrometer is constant and said first difference signal is equal to zero when the concentration of said selected isotope in said first material is equal to the concentration of said selected isotope in said third material, and wherein said second output signal from said mass spectrometer is constant and said second difference signal is equal to zero when the concentration of said selected isotope in said second material is equal to the concentration of said selected isotope in said third material.

22. A method in accordance with claim 21 wherein said first output signal from said mass spectrometer is a square wave and said first difference signal is approximately equal to the integral of said first output signal, and wherein said second output signal from said mass spectrometer is a square wave and said second difference signal is approximately equal to the integral of said second output signal.

23. A method in accordance with claim 20 wherein both said first material and said second material are materials having unknown concentrations of said selected isotope.

24. A method in accordance with claim 20 wherein the volume of sample contained in said sample loop of said sample valve is at least about 1 cc.

25. A method in accordance with claim 24 wherein said sample loop of said sample valve has an inside diameter of about 0.159 cm and a length in the range of about 50 cm to about 500 cm.

* * * * *